United States Patent
Lu et al.

(10) Patent No.: US 11,232,364 B2
(45) Date of Patent: Jan. 25, 2022

(54) AUTOMATED RULE RECOMMENDATION ENGINE

(71) Applicant: DataVisor, Inc., Mountain View, CA (US)

(72) Inventors: Catherine Lu, Mountain View, CA (US); Patrick Glenn Murray, Mountain View, CA (US); Ming Qi, Santa Clara, CA (US); Shuo Shan, San Jose, CA (US); Yinglian Xie, Cupertino, CA (US); Fang Yu, Sunnyvale, CA (US); Yuhao Zheng, Sunnyvale, CA (US)

(73) Assignee: DataVisor, Inc., Mountain View, CA (US)

( * ) Notice: Subject to any disclaimer, the term of this patent is extended or adjusted under 35 U.S.C. 154(b) by 844 days.

(21) Appl. No.: 15/944,701

(22) Filed: Apr. 3, 2018

(65) Prior Publication Data

US 2018/0285745 A1   Oct. 4, 2018

Related U.S. Application Data

(60) Provisional application No. 62/481,063, filed on Apr. 3, 2017.

(51) Int. Cl.
| | |
|---|---|
| *G06N 20/00* | (2019.01) |
| *G16H 50/30* | (2018.01) |
| *G06K 9/32* | (2006.01) |
| *G06N 5/02* | (2006.01) |
| *G06N 5/04* | (2006.01) |
| *G06F 16/35* | (2019.01) |

(Continued)

(52) U.S. Cl.
CPC ............. *G06N 5/025* (2013.01); *G06F 16/35* (2019.01); *G06F 21/566* (2013.01); *G06F 21/604* (2013.01); *G06N 5/046* (2013.01); *G06N 20/00* (2019.01)

(58) Field of Classification Search
CPC ........ G06N 20/00; G06N 5/025; G06N 5/046; G06F 21/566; G06F 21/604; G06F 16/35
USPC ...................................................... 706/1–62
See application file for complete search history.

(56) References Cited

U.S. PATENT DOCUMENTS

| | | | |
|---|---|---|---|
| 5,712,793 A | 1/1998 | Scepanovic et al. | |
| 6,742,128 B1 | 5/2004 | Joiner | |

(Continued)

OTHER PUBLICATIONS

Cai D., et al., (2005) "Comparison of feature selection and classification algorithms in identifying malicious executables" Retrieved from https://www.sciencedirect.com/science/article/pii/S0167947306003288 (Year: 2005).*

(Continued)

*Primary Examiner* — Brandon S Cole
(74) *Attorney, Agent, or Firm* — Fish & Richardson P.C.

(57) ABSTRACT

Methods, systems, and apparatus, including computer programs encoded on computer storage media, for rule generation and interaction. A rules engine is provided that does not require manual effort to generate or maintain high-quality rules over time for detecting malicious accounts or events. Rules no longer need to be manually added, tuned, or removed from the system. The system is able to determine the health of each rule and automatically add, tune, and remove rules to maintain a consistent, effective rule set.

19 Claims, 5 Drawing Sheets

(51) Int. Cl.
   *G06F 21/56* (2013.01)
   *G06F 21/60* (2013.01)

(56) References Cited

U.S. PATENT DOCUMENTS

| | | | |
|---|---|---|---|
| 7,668,957 | B2 | 2/2010 | Achlioptas et al. |
| 8,285,536 | B1 | 10/2012 | Kumar et al. |
| 8,312,540 | B1 | 11/2012 | Kahn et al. |
| 8,418,249 | B2 | 4/2013 | Nucci et al. |
| 8,677,488 | B2 | 3/2014 | Kang et al. |
| 8,789,171 | B2 | 7/2014 | Osipkov et al. |
| 8,849,921 | B2 | 9/2014 | Morss et al. |
| 8,887,286 | B2 | 11/2014 | Dupont et al. |
| 9,069,963 | B2 | 6/2015 | Barnes, II |
| 9,148,441 | B1 | 9/2015 | Tamersoy et al. |
| 9,183,387 | B1 | 11/2015 | Altman et al. |
| 9,467,464 | B2 | 10/2016 | Gula et al. |
| 9,787,640 | B1 | 10/2017 | Xie et al. |
| 10,009,358 | B1 | 6/2018 | Xie et al. |
| 10,110,616 | B1 | 10/2018 | Xie et al. |
| 10,129,288 | B1 | 11/2018 | Xie et al. |
| 10,135,788 | B1 | 11/2018 | Xie et al. |
| 10,771,497 | B1 | 9/2020 | Xie et al. |
| 10,949,854 | B1* | 3/2021 | Kramme ............ G06Q 20/3224 |
| 2003/0172043 | A1* | 9/2003 | Guyon ................ G06N 20/10 706/48 |
| 2004/0133536 | A1 | 7/2004 | Uceda-Sosa |
| 2007/0027674 | A1 | 2/2007 | Parson et al. |
| 2007/0240217 | A1 | 10/2007 | Tuvell et al. |
| 2007/0289013 | A1* | 12/2007 | Lim ................... H04L 63/1425 726/22 |
| 2009/0013410 | A1 | 1/2009 | Kaier et al. |
| 2009/0129599 | A1 | 5/2009 | Garcia et al. |
| 2009/0228296 | A1 | 9/2009 | Ismalon |
| 2009/0249480 | A1 | 10/2009 | Osipkov et al. |
| 2010/0095374 | A1 | 4/2010 | Gillum et al. |
| 2010/0115621 | A1 | 5/2010 | Staniford et al. |
| 2010/0313264 | A1 | 12/2010 | Xie et al. |
| 2011/0082768 | A1 | 4/2011 | Eisen |
| 2012/0090028 | A1 | 4/2012 | Lapsley et al. |
| 2012/0137367 | A1 | 5/2012 | Dupont et al. |
| 2013/0185230 | A1 | 7/2013 | Zhu et al. |
| 2013/0347113 | A1 | 12/2013 | Yu et al. |
| 2014/0095689 | A1 | 4/2014 | Borgs et al. |
| 2014/0259156 | A1 | 9/2014 | Beutel et al. |
| 2014/0317736 | A1 | 10/2014 | Cao et al. |
| 2015/0047034 | A1 | 2/2015 | Burnham et al. |
| 2015/0121461 | A1 | 4/2015 | Dulkin et al. |
| 2015/0161394 | A1 | 6/2015 | Ferragut et al. |
| 2015/0254555 | A1 | 9/2015 | Williams, Jr. et al. |
| 2016/0260211 | A1* | 9/2016 | Gillies .................. G16H 50/30 |
| 2016/0364750 | A1 | 12/2016 | Malloy et al. |
| 2018/0204111 | A1* | 7/2018 | Zadeh ................ G06N 3/0436 |
| 2018/0285745 | A1* | 10/2018 | Lu ........................ G06N 20/00 |
| 2019/0188212 | A1* | 6/2019 | Miller .................. G06N 7/005 |

OTHER PUBLICATIONS

Grzymala-Busse, J. "Rule Induction from Rough Approximations", In Pedrycz, K. Springer Handbook of Computational Intelligence</i> (New York, Springer, 2015) Chapter 23 pp. 371-384. (Year: 2015).*

*Dense Subgraph*. Wikipedia, the free Encyclopedia. Last modified Dec. 9, 2014. Retrieved on Feb. 11, 2015. Retrieved from the Internet: URL<http://en.wikipedia.org/w/index.php?title=Dense subgraph>, 2 pages.

*Disjoint-Set Data Structure*. Wikipedia, the free Encyclopedia. Last modified Feb. 2, 2015. Retrieved on Feb. 11, 2015. Retrieved from the Internet: URL<http://en.wikipedia.org/wiki/Union find>. 6 pages.

*JaccardIndex*. Wikipedia, the free Encyclopedia. Last modified Nov. 22, 2014. Retrieved on Feb. 11, 2015. Retrieved from the Internet: URL<http://en.wikipedia.org/wiki/Jaccard_index>, 6 pages.

*Kullback-Leibler Divergence*. Wikipedia, the free Encyclopedia. Last modified Jan. 16, 2015. Retrieved on Feb. 11, 2015. Retrieved from the Internet: URL<http://en.wikipedia.org/wiki/Kullback%E2%80%93Leibler_divergence>. 11 pages.

*Tarjan's Strongly Connected Components Algorithm*. Wikipedia, the free Encyclopedia. Last modified Jan. 16, 2015. Retrieved on Feb. 11, 2015. Retrieved from the Internet: URL<http://en.wikipedia.org/wiki/Taijan's_strongly_connected_components_algorithm>. 4 pages.

*Student's t-distribution*. Wikipedia, the Free Encyclopedia. Last modified Feb. 10, 2015. Retrieved on Feb. 11, 2015. Retrieved from the Internet: URL<http://en.wikipedia.org/wiki/Student%27s_t-distribution>. 19 pages.

Authorized officer Lee W. Young, International Search Report and Written Opinion in Application No. PCT/US2018/025938, dated Jun. 27, 2018, 9 pages.

U.S. Appl. No. 14/620,048, filed Feb. 11, 2015, Xie et al.
U.S. Appl. No. 14/620,062, filed Feb. 11, 2015, Xie et al.
U.S. Appl. No. 14/620,029, filed Feb. 11, 2015, Xie et al.

* cited by examiner

Rules Engine Powered by Unsupervised Machine Learning  |  Search by Rule ID | Search Overview  Automated  Manual Daily Snapshot  2017-03-22

Types  ⚫ Hierarchy  ⚫ Definitions

| Rule | Detected ▼ | % Detected ▼ | Incremental Coverage ▼ | %Incremental ▼ | |
|---|---|---|---|---|---|
| 8FA7C2DE<br>ip_prefix_20 in a list 5.101.208.0, 37.9.32.0, 185.14.192.0, 188.68.0.0 (...) | 79508 | 69.3% | 50 | 0.0% | 🗐 👁 |
| 1EDB4792<br>recent_event_ids =<br>user_create, user_follow, register, user_edit, interest_follow<br>email_email_provider_mail.com | 6495 | 5.7% | 2 | 0.0% | 🗐 👁 |
| C52B5C31<br>recent_event_ids = user_create, register<br>ip_prefix_20 in a list 5.189.192.0, 37.9.32.0 | 3676 | 3.2% | 2 | 0.0% | 🗐 👁 |
| F226A31<br>signup_ip_prefix_20 in a list 46.161.48.0, 5.189.192.0, 198.15.112.0<br>5.8.32.0 (...) | 18026 | 15.7% | 27 | 0.0% | 🗐 👁 |
| 409CF941<br>id in a list 905860168503, 918105274601, 922134410098<br>ip_prefix_20 = 46.161.48.0 | 1361 | 1.2% | 1 | 0.0% | 🗐 👁 |
| 27DFAE55<br>ip_ip_country in a list Ukraine, Russia, Belarus, Republic of Moldova (...)<br>recent_event_ids =<br>user_create, user_follow, register, user_edit, interest_follow | 15940 | 13.9% | 29 | 0.0% | 🗐 👁 |
| 35A8E3F5<br>ip_ip_country = Serbia<br>ip_is_from_datacenter = true | 650 | 0.6% | 1 | 0.0% | 🗐 👁 |
| 15D7FAB1<br>ip_ip_timezone = Europe/Warsaw<br>signup_ip_prefix_20 = 95.181.176.0 | 636 | 0.6% | 1 | 0.0% | 🗐 👁 |
| 3072F44C<br>ip_ip_country = Russia<br>signup_ip_prefix_20 in a list 185.101.64.0, 185.106.96.0, 89.154.192.0,<br>96.126.112.0 (...) | 2501 | 2.2% | 2 | 0.0% | 🗐 👁 |
| 5C059471<br>Name = jennifer<br>recent_event_ids =<br>user_create, user_follow, register, user_edit, interest_follow | 564 | 0.5% | 1 | 0.0% | 🗐 👁 |

Previous | 1 | 2 | 3 | 4 | 5 | 6 | 7 | 8 | 9 | 10 | ... | 19 | Next

Rules Engine Powered by Unsupervised Machine Learning | Search By Rule ID | Search Overview  Automated  Manual

504 → Create New Rule

⬤ Definitions

| Rule | Detected | Incremental Coverage | %Incremental |
|---|---|---|---|
| DB1132D<br>ip_prefix_20 = 5.189.92.0 | 0 | 0 | 0.0% |
| 4A453A57<br>email_email_provider = email.com | 78975 | 0 | 0.0% |
| 632126A1<br>ip_prefix_20 = 5.189.192.0 | 12983 | 0 | 0.0% |
| 721FF0CD<br>ip_prefix_20 = 79.110.16.0 | 5796 | 1 | 0.0% |

506 → Backtests

| | |
|---|---|
| DB1132D<br>Run on: 2017-03-21 22:46:46 | 43F7ADB9     Run on 2017-02-28 00:00:26<br>Data from LAST 1 Day(s) |
| 7840B530<br>Run on: 2017-03-14 02:35:16 | ip_prefix_20 in a list 37.9.32.0, 178.57.64.0, 5.189.192.0, 79.110.16.0,<br>146.185.192.0, 91.204.0.0, 185.101.64.0, 95.181.208.8, 46.161.48.0, 179.61.192.0, 185.14.192.0,<br>91.200.80.0, 5.101.208.0, 188.72.112.0.0, 5.62.144.0, 95.85.80.0, 95.181.176.0, 188.68.0.0, 185.89.96.0,<br>185.46.80.0, 5.8.32.0, 93.179.80.0, 205.99.224.0 |
| 74E530D7<br>Run on: 2017-03-14 02:30:55 | |
| 5F01FB44<br>Run on: 2017-03-14 02:27:55 | Accuracy |
| 4A453A57<br>Run on: 2017-03-14 02:26:22 | ◯ Incremental Coverage<br>41 Users (0.05 %)<br>View Users |
| 632126A1<br>Run on: 2017-03-08 19:06:00 | 0.00%<br>potential FP |
| 43F7ADB9<br>Run on: 2017-02-28 00:08:24 | ● Unsupervised<br>83467 Users (99.95 %)<br>View Users |
| 7227811<br>Run on: 2017-02-24 14:25:53 | 41 of users detected by this rule were not detected by<br>unsupervised or other methods. |
| 721FF0CD<br>Run on: 2017-03-07 01:31:53 | |
| 6E5E11B7<br>Run on: 2017-02-21 17:47:51 | |
| 4FF280DF<br>Run on: 2017-02-23 01:41:53 | |
| 5E58D7A<br>Run on: 2017-02-21 16:08:21 | |
| 4FF280DF<br>Run on: 2017-02-21 16:56:55 | |

FIG. 5

AUTOMATED RULE RECOMMENDATION ENGINE

CROSS-REFERENCE TO RELATED APPLICATION

This application claims priority to U.S. Provisional Application No. 62/481,063, filed on Apr. 3, 2017. The disclosure of the prior application is considered part of and is incorporated by reference in the disclosure of this application.

BACKGROUND

This specification relates to rules engines.

Rules engines are common in corporate settings with wide-ranging functionality, including being used for detecting certain types of entity behavior. An entity can be a user, user account, business, etc. The entity behavior can include fraudulent activity, anti-money laundering, or other forms of entity behavior.

Conventional rules engines are used for a wide variety of applications, including but not limited to fraud prevention, anti-money laundering efforts, and enforcing business policies.

Typically, rules engines are largely manually handled such that rules must be added, tuned, and removed from the rules engines by a human. Usually, these humans manually generate rules based on domain expertise.

SUMMARY

This specification describes techniques for generating and maintaining a rules engine that eliminates the need for manual intervention in adding new rules, tuning existing rules, and removing rules that are no longer relevant. A system can take in a labeled data set and output many (e.g., up to thousands) general rules to model the labeled data set, allowing these rules to therefore be automatically generated. Rules are then maintained, removed, and created based on the changing data that is fed into the system.

This specification further describes a user interface that provides graphs and metrics for showing the overall health of all of the rules in the system, in addition to the health of each individual rules. Graphs include effectiveness over time and number of rules in deployment. Rule health metrics include accuracy, coverage, and false positive rate.

This specification also describes using the system to support manual rules to be added to the rules engine. In particular, the system supports an ability to back-test the manually generated rule against one or more labels, which may be created in a number of ways including but not limited to unsupervised machine learning, supervised machine learning, and manual review. Then, a backtest of a manually created rule can be run, e.g., in response to user input, against this historical labeled dataset.

In general, one innovative aspect of the subject matter described in this specification can be embodied in methods that include the actions of obtaining input data points associated with a plurality of users; determining whether the input data points are labeled or unlabeled; in response to determining that the data points are labeled, determining a set of features from the input data points using supervised machine learning techniques; generating a group of candidate single variable rules using the determined set of features, wherein each rule specifies a matching condition based on a corresponding feature dimension; generating a group of candidate multi-variable rules from the single-variable rules; filtering the candidate single-variable and multi-variable rules using the labeled input data points to generate a final set of valid rules; and outputting the final set of valid rules.

Aspects of the subject matter described in this specification can be embodied in methods, computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. In response to determining that the data points are not labeled: generating labels using unsupervised machine learning; generating clusters of positively labeled data points; and determining a set of features for each cluster. The rules are periodically updated based on recent data points. Each data point corresponds to a user generated event and includes a group of attributes describing the event. Filtering the candidate single-variable and multi-variable rules includes evaluating the candidate rules on the labeled data points based on accuracy and effectiveness metrics. The method further includes: maintaining metrics about each rule in the final set of valid rules including one or more of rule effectiveness, false positive rate, and recency. Rules that fail to satisfy metric thresholds are removed. The method further includes: providing a user interface configured to selectively present rules and data about the effectiveness of each rule. The user interface is further configured to receive manually generated rules from a user, wherein the manually generated rules are backtested against historical data to validate the manually generated rules.

The subject matter described in this specification can be implemented in particular embodiments so as to realize one or more of the following advantages over manually created rules.

First, automated rules can be frequently updated to ensure that they remain effective over time. Manually created rules can quickly become ineffective as attackers modify tactics. For example, a manually crafted rule that targets a particular domain, e.g., addresses that end with a specific domain such as a domain associated with an email provider, becomes ineffective when attackers switch to another domain. Second, automated rules are less likely to trigger false positives in detection as each of them has to go through rigorous systematic testing. For example, the above example manual rule can falsely detect legitimate users of the email provider at that domain. In contrast, automated rules can be specifically defined either in the rule or with one or more sub-rules to limit false positives. For example, in addition to a rule targeting a current domain, a sub rule can require additional criteria to be satisfied that limits false positives (e.g., a specified transaction range). Finally, manually crafted rules are time consuming to generate and tune, while automated rules completely eliminate such manual tuning efforts.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example user interface that illustrates a set of automatically generated rules in the system.

Like reference numbers and designations in the various drawings indicate like elements.

DETAILED DESCRIPTION

Automatic Rule Generation

Figure 1:
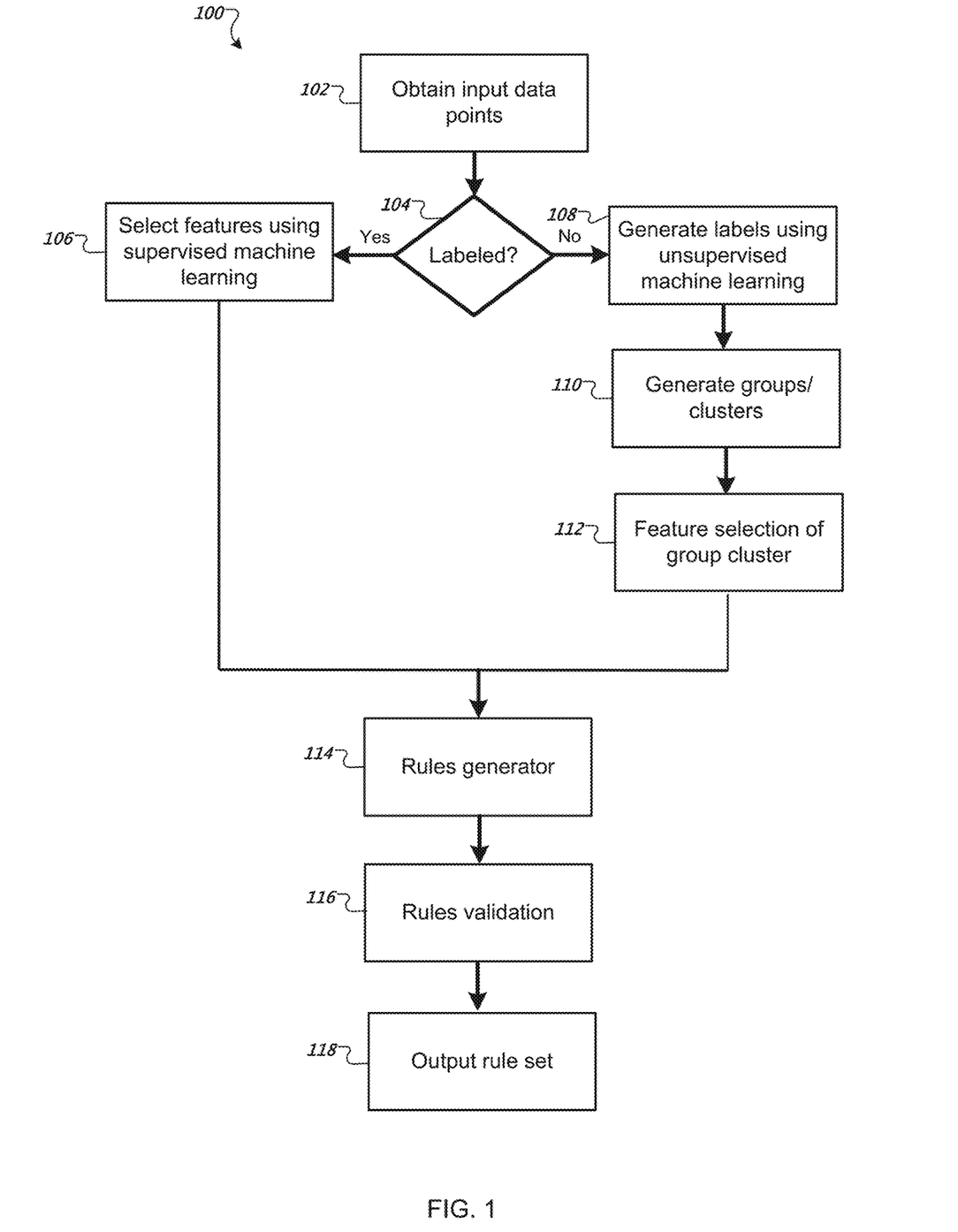
FIG. 1 is a flow diagram of an example process for automatically generating rules.

FIG. 1 is a flow diagram of an example process 100 for automatically generating rules. A rules engine can be used to generate rules based on input data. The rules engine can be part of a system, e.g., a system for detecting malicious accounts or events across one or more networks. For convenience, the process 100 will be described with respect to such a system that performs the process 100. The system obtains input data points 102 and outputs a set of rules 118. The input data points may or may not come with predefined labels. If the input data points do not come with predefined labels, the rule engine can leverage unsupervised machine learning algorithms to generate labels first and further classifies positively labeled data into clusters. In some implementations, the unsupervised machine learning can be performed using a system as described in one or more of the following U.S. patents: U.S. Pat. Nos. 9,787,640, 10,009,358, 10,110,616, and 10,129,288, all of which are incorporated here by reference.

Referring to FIG. 1, the system determines 104 whether or not the obtained input data is labeled. If the obtained input data points are labeled, the system identifies features 106, for example, using supervised machine learning techniques. In some implementations, a top set of features are determined based on a particular scoring metric.

The system can use supervised machine learning techniques as a guide for selecting top relevant features that best separate the positively labeled data from negatively labeled data. For example, machine learning algorithms such as decision trees or random forests provide information on top features that best classify positively labeled input data from the rest. Such algorithms can guide the selection of top features.

The top features are then used to generate candidate rules 114. For example, the system can use the features in various combinations to generate the candidate rules. The system validates 116 the candidate rules. For example, the system can evaluate the results of the rules on the labeled data according to effectiveness and accuracy metrics, for example, whether a rule is able to capture targeted labeled data without false positives. The system determines 118 the final set of rules based on the validation results.

Rule Engine Input

The input data to the rule engine can include a list of input lines, with each line containing a data point described by a list of feature attributes. A data point usually describes an entity of interest of detection. For example, a data point could correspond to a user generated event, e.g., a login event, with a list of attributes describing the particular event, including event time, user ID, the event type, associated device type, user agent, IP addresses etc. A data point could also correspond to a user account with a list of attributes describing this user including user demographic information, e.g., age, location, user profile information, e.g., email address, nick name, or user behavior patterns, e.g., historical events and their attributes.

The goal of rule generation is to automatically derive and maintain a set of rules that maximally match all the positively labeled data points but do not match negatively labeled data points.

In some cases, each data point in the input to the rule engine has already associated with a label of positive or negative (yes' branch of FIG. 1). A positively labeled data point could indicate that the corresponding entity is detected as a fraudulent or abusive entity. More general cases of labeled data points could also include other use cases where a label means "is a marketing target candidate", or "is a recommended item", or "is a user for promotion target".

In some implementations the input data points are not labeled (no' branch of FIG. 1). The system generates labels for the obtained input data. In the example process 100 of FIG. 1, the system uses unsupervised machine learning to generate 108 labels from the obtained input data. For example, the unsupervised machine learning can generate a label for each input line in the input data. The system can further cluster 110 positively labeled input data points (i.e., feature attributes) and tag them by their cluster identifiers. Data points tagged by the same cluster ID or group ID means they will be more similar to each other based on distance metrics (e.g., Euclidean or cosine distance) in the corresponding feature space.

Rule Generation

The system can use the following steps to automatically generate rules for each cluster or group. First, the rules engine can sort all features by the coverage of positively labeled data within this cluster, and select top features 112. The top features can be used to generate single-variable (i.e., single-feature) rules during rules generation 114. Each single-variable rule specifies a matching condition based on the corresponding feature dimension (e.g., IP address equal to certain value, or User Agent String contains a particular substring). The selection of top features can be guided by a threshold of their matching coverage. Second, the rules engine can create candidate multi-variable rules during rules generation 114 by generating combinations of single variables from those single-variable rules using logical expressions (e.g., "AND" or "OR" conditions). The purpose is to generate more fine-grained rules that match as many positively labeled data points while reducing the false positive cases. The rules engine can match all candidate multi-variable rules with the negatively labeled input data, during rules validation 116 and filter away those rules with high coverage on negatively labeled data based on a preset threshold (e.g., 1% FP rate). Finally, the rules engine can collect and output all valid rules for this cluster as part of generating the output rule set 118. After generating rules for each cluster, the rule engine can merge all rules derived each cluster and remove duplicate rules for the final output rules 118.

In some alternative implementations, the rules engine can generate rules using input data where input data points are already pre-labeled, but not clustered or grouped. In this implementation, the rules engine can treat all the data points that are positively labeled as belonging to the same group or cluster and use the above method to generate rules.

Rule Update and Expiration

Rule generation can be performed regularly, for example, on a daily basis. Rules generated over time can be further merged together to remove duplicates to ensure low complexity in matching rules against new data set.

Rules derived by the rule engine will also be automatically updated over time to ensure they are effective against changing input data patterns (e.g., caused by evolving techniques or attacks patterns of adversaries), and to bound the number of rules and ensure a low run-time complexity in rule matching. For rules that no longer match positively labeled data well (e.g., based on a coverage threshold) for certain amount of time (e.g., 3 days) and on a consistent basis, the rule engine can simply remove those rules to ensure only effective rules are present in the system.

In some implementations, additional input data, e.g., over a subsequent time period, can be used to generate rules so that updated rules can be generated, which can allow for removal of rules that are no longer effective. In some other implementations, updated input data can be used to revalidate the existing rules so that rules that are no longer effective can be quickly identified.

Rule Engine Interfaces

Overview

Figure 2:
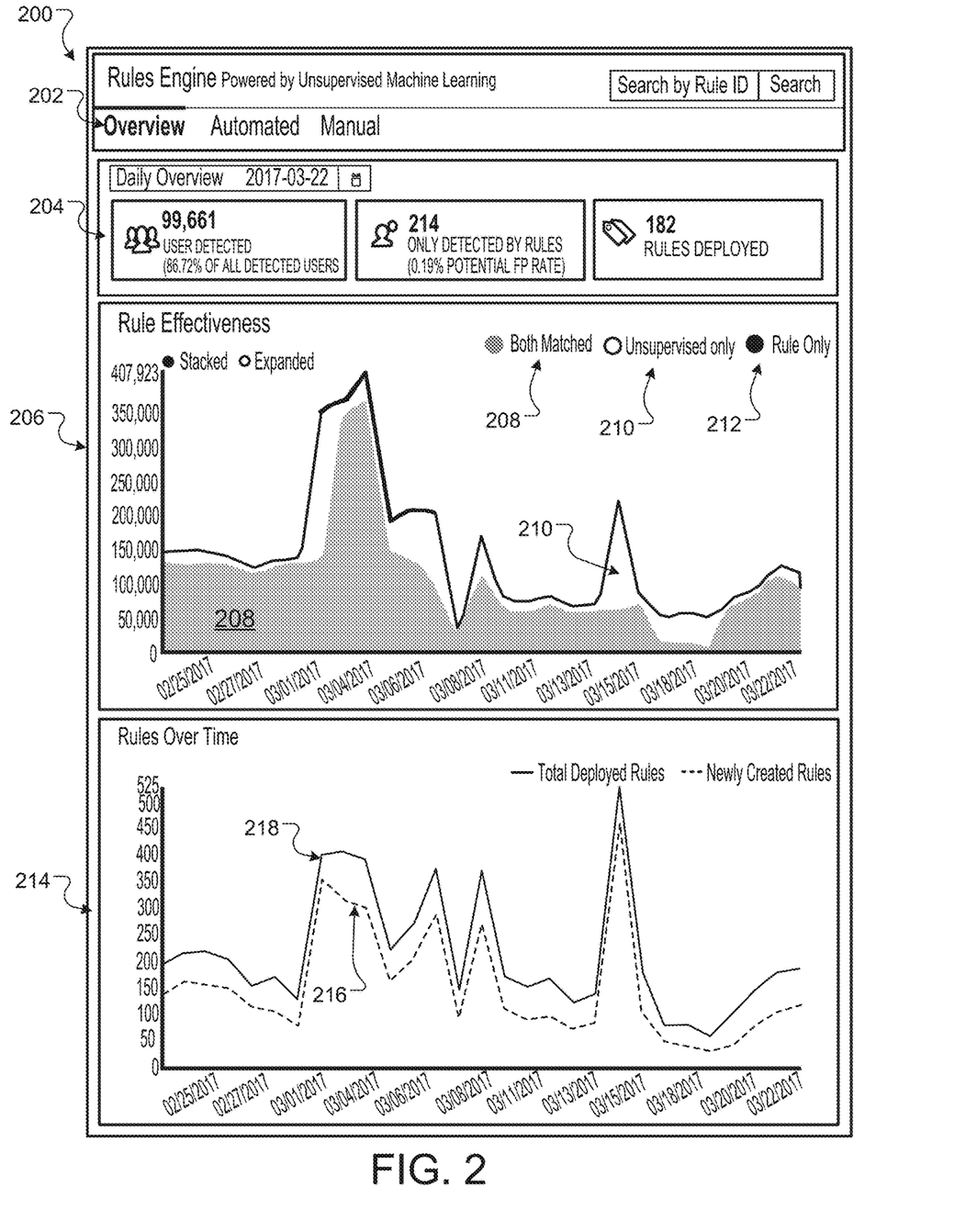
FIG. 2 is an example user interface that illustrates an overview of an automated rule engine for detecting fraudulent users.

FIG. 2 is an example user interface 200 that illustrates an overview of an automated rule engine for detecting fraudulent users. At the top of the user interface 200, an overview tab 202 is selected, which shows at a high level the daily overview of all of the rules, automated and manual, that are currently deployed in the system. A first portion 204 shows the effectiveness of all the rules as the detected number, the false positive rate, and total number of rules that are deployed in the system. Below the high level overview, a second portion 206 shows a graph that illustrates the effectiveness of the rules over time as a stacked graph with 3 segments: the detection rate by both rules and the labeled data set 208, the detection rate by the labeled data set only 210, and the detection rate by rules only 212. Below the second portion 206, a third portion 214 shows a graph that illustrates the number of rules over time, as newly created for a particular day over time 216 and as the total number of deployed rules over time 218.

The detection rate by both rules and the labeled data set 208 represents the number of users that were detected by both the labeled data set and the rules that were created. The detection rate by rules only 212 can illustrate areas that need further refinement from the rules set to reach users that were not covered by the rules but that were detected according to the unsupervised detection algorithm The detection rate by rules only 212 indicates users that were uniquely detected by the rules. This is typically small and may indicate correct detection by the rules that was missed in the labeled data set. However, in some cases it can indicate a false positive result. Thus, these may require further investigation to determine if the detections are erroneous.

Rule Engine Output: Automatically Generated Rules

FIG. 3 is an example user interface 300 that illustrates a set of automatically generated rules in the system. In particular, in FIG. 3 an automated tab 302 is selected. The user interface 300 illustrates rows of automatically generated rules 304.

There are also 2 toggles: a hierarchy toggle 306 and a definitions toggle 308. When the hierarchy toggle 306 is activated, rules are rolled up into sub-rules. For instance, if a rule 1 comprises of logical expressions A & B and another rule 2 comprises of logical expression A only, then rule 1 is a sub-rule of rule 2. With the hierarchy on, only rule 1 will be shown. However, there is a visual border indicator that a sub-rule exists 310, and user interaction with this border shows the sub-rules within it. Multiple layers can exist within the rules.

For example, a first type of rule with sub-rules is "In a list". For example, a rule "email_domain in list gmail.com, outlook.com" has 2 sub-rules: email_domain=gmail.com and email_domain=outlook.com. A second type of rule with sub-rules is not necessarily contained but has more specifics in the sub-rules. For example, a rule "email_domain=gmail.com" can have a sub-rule "email_domain=gmail.com AND registration_state=California".

Turning on the definitions toggle 308 shows the definition of each rule. Therefore, it's possible to view the actual expressions for each rule.

For each rule, high-level metrics are shown: a rules ID, effectiveness metrics, and false positive metrics. There are also actions for each rule. For instance, a user can pause or play rules to either remove or add them into the actual detection logic. The user can also view the details of a particular rule by selecting a particular rule (see "Rule Details" below).

Above all of this, there is the ability to change the date 312 for what rules are presented that are in the system at a given point in time. The user interface 300 also includes there is a page picker 314 that allows the user to quickly jump to other pages in the rules. This also prevents too many rules from loading all at once for the user.

Rule Details

Figure 4:
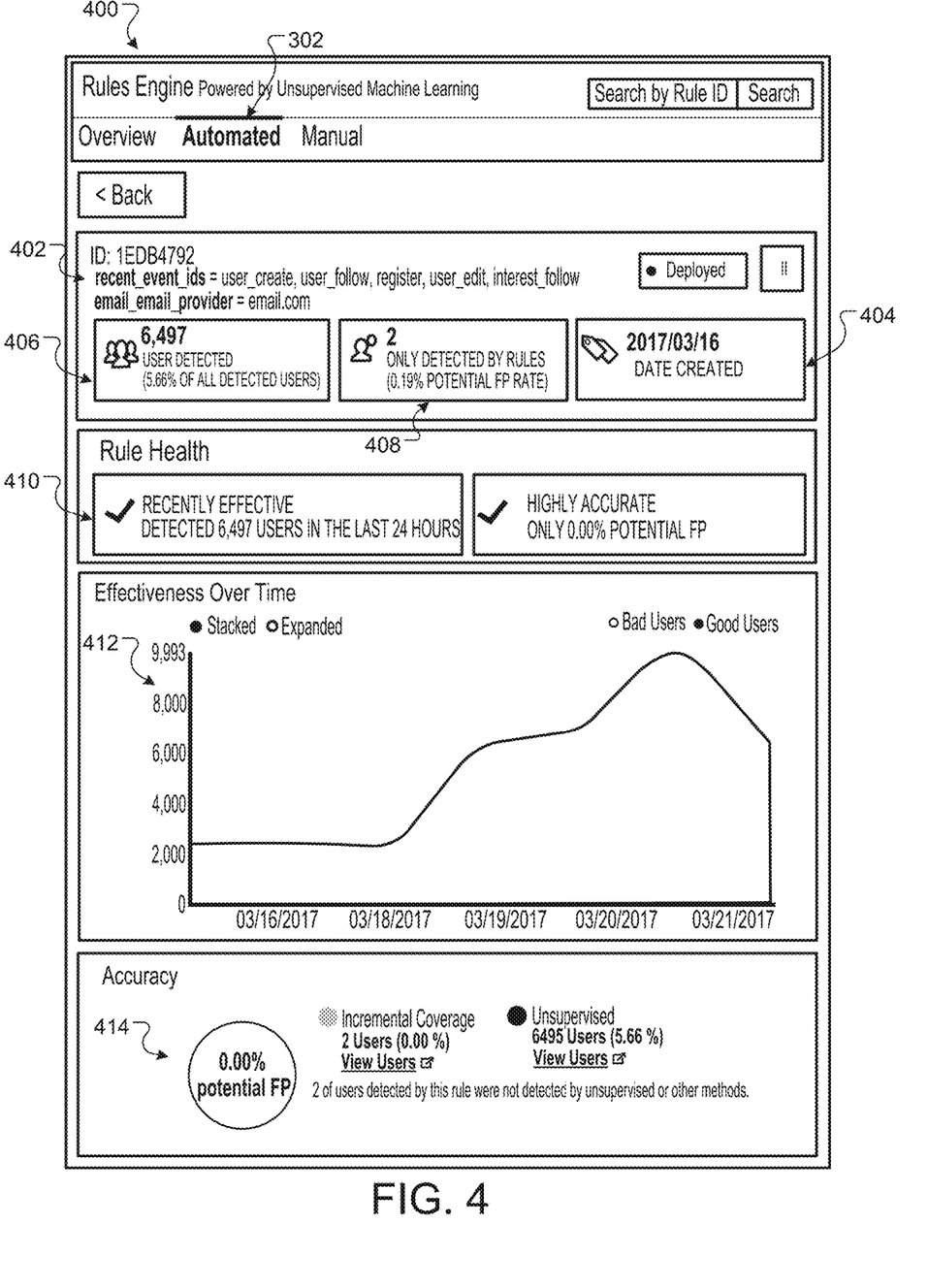
FIG. 4 is an example user interface that illustrates details for a particular rule.

FIG. 4 is an example user interface 400 that illustrates details for a particular rule under the automated tab 302. For example, the details can be presented in response to a user selection of a details button for a particular rule in the user interface 300.

The user interface 400 presents the rule's definition and ID 402. The user interface 400 also includes information such as when the rule was created 404. The user interface 400 also includes high-level stats about the rule's health: it's effectiveness 406 and false positives rate 408, e.g., derived from detection information and labeled data, and there are at-a-glance icons 410 that show how healthy the rule is. Below that, there are graphs 412 that show the effectiveness versus false positives rate over time for the rule. Finally, the user interface 400 includes the latest accuracy 414 for the rule, derived from backtesting against historical results, e.g., against either input labels in the input data or derived labels from unsupervised learning algorithms. Rule information including the rule definition and metadata such as the creation date can be obtained from a rule repository that stores the set of rules.

Manual Rule Input and Backtest

Figure 5:
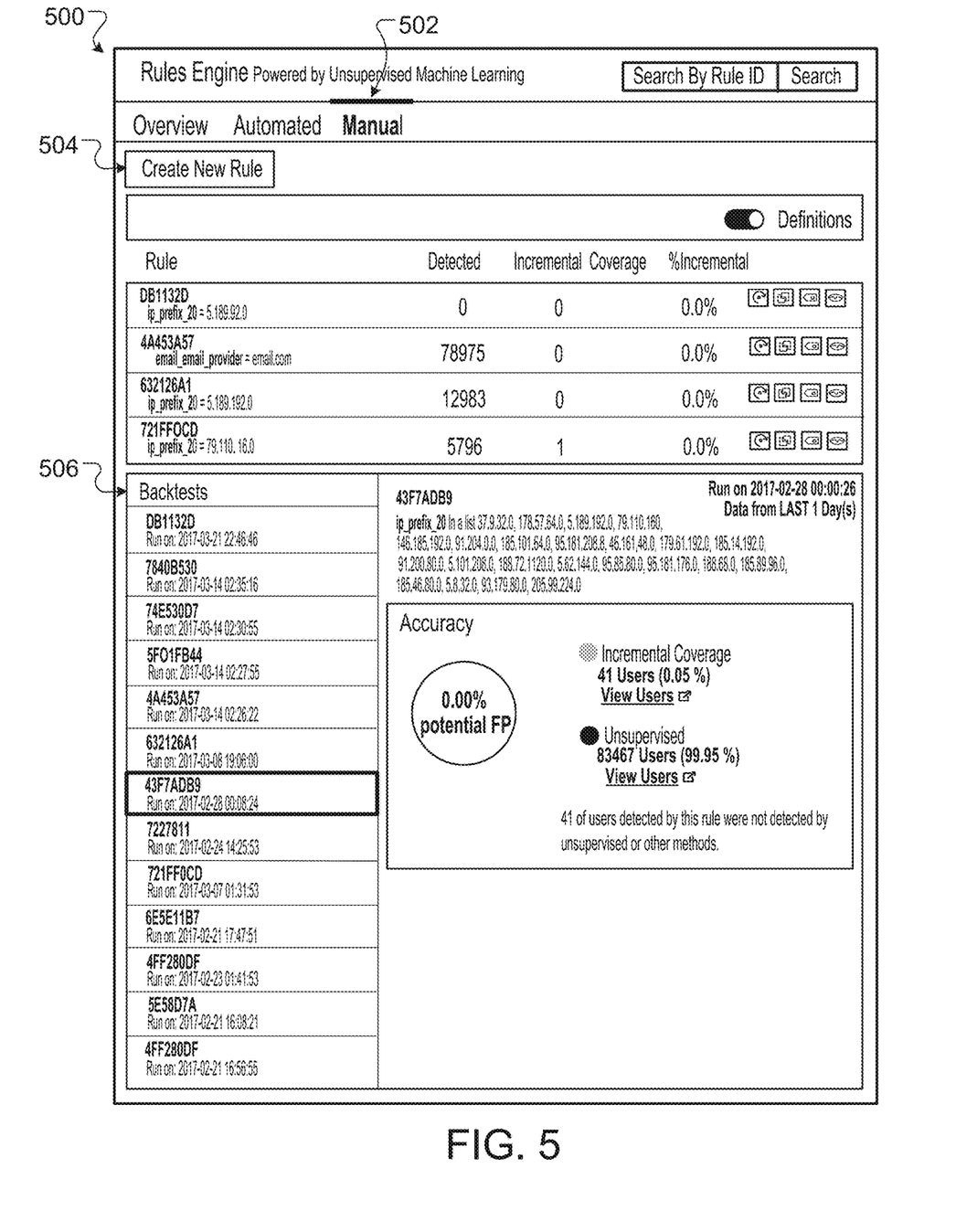
FIG. 5 is an example user interface that illustrates a set of manual rules, along with backtest results.

The automated rule engine also permits the addition of manually generated rules and allows automatic backtest of manually created rules. FIG. 5 is an example user interface 500 that illustrates a set of manually edited rules, along with the backtest results. In particular, in FIG. 5 a manual tab 502 is highlighted as selected. The user interface 500 allows the user to create rules 504 in the system to augment the detection of the current system. The manual rules can also, rather than do detection, result in whitelisting users. The manual rule creation process allows for complex Boolean expressions with AND and OR statements, and a wide variety of operands. These operands include standard numerical operands (e.g. equals, less than, greater than, less than equals, greater than equals) and string operands (e.g. equals, starts with, ends with, regex match, sub string).

Once a rule has been created, it can be backtested in the system against either input labels in the input data or derived labels from unsupervised learning algorithms. The backtest results 506 highlight the effectiveness of the rule and potential false positives, and from there, the user can check the actual users that were matched by the rule. These users are broken down into users that seem like they are correctly or incorrectly labeled by the rule.

The backtest is done automatically. The backtest provides the metrics for the effectiveness and false positive rate for each rule by testing the rule against one or more days of labeled data.

Search

From any page, the user can search for a particular rule in their system. Further, the user can see from the user details page the particular rule that detected that user.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following embodiments are also innovative:

Embodiment 1 is a system configured to provide a user interface that displays an overview of the effectiveness of all rules deployed in the system.

Embodiment 2 is the system of embodiment 1, wherein the user interface provides high level metrics for presentation of a plurality of the rules within the system, including the overall effectiveness, the overall false positives rate, and the total number of rules currently deployed.

Embodiment 3 is the system of any one of embodiments 1 through 2, wherein the user interface provides a chart showing an effectiveness over time for the rules, charting rules coverage, missed coverage, and false positives.

Embodiment 4 is the system of any one of embodiments 1 through 3, wherein the user interface provides a chart showing a number of rules created and a number of rules deployed on a particular date.

Embodiment 5 is the system of any one of embodiments 1 through 4, wherein the user interface provides a dropdown with ability to toggle between a dashboard for all rules, automated rules only, and manual rules only.

Embodiment 6 is the system of any one of embodiments 1 through 5, wherein the user interface provides an input box with ability to change a date for when to view a snapshot of a dashboard showing rules.

Embodiment 7 is a system configured to provide a user interface that displays a list of the automatically generated rules that allows easy management including automatically ordering rules, organizing rules into general rules and sub-rules, and searching functions.

Embodiment 8 is the system of embodiment 7, wherein the user interface automatically orders rules based on the effectiveness of the rules. For example, the rule capture most entities can be listed on the top.

Embodiment 9 is the system of any one of embodiments 7 through 8, wherein the user interface organizes rules into groups so that it is easier to review. The user interface includes one or more selectable elements that provide toggling on/off sub-rules within more general rules. Sub-rules within sub-rules are possible.

Embodiment 10 is the system of any one of embodiments 7 through 9, wherein the user interface includes one or more selectable elements for toggling on/off the rules definition, making the interface cleaner or more detailed depending on user's preference.

Embodiment 11 is the system of any one of embodiments 7 through 10, wherein the user interface includes tabular view of the automated rules with metrics per column, showing one or more metrics selected from the set consisting of the total detection rate, % detection rate out of total entity set to be detected, total false positives, or % false positives rate.

Embodiment 12 is the system of any one of embodiments 7 through 11, wherein the user interface includes a selectable view details button that when selected shows the detailed information of a particular rule in a separate display.

Embodiment 13 is the system of any one of embodiments 7 through 12, wherein the user interface includes an input box, wherein in response to user interaction with the input box a date for when to see a snapshot of the automated rules is specified.

Embodiment 14 is a system configured to provide a user interface that allows users to control rules including to clone, pause, and deploy them.

Embodiment 15 is the system of embodiment 14, wherein the user interface includes a selectable clone button associated with each automated rule, wherein in response to selection of the clone button, the system presents a rule editor interface with the associated automated rule inputted.

Embodiment 16 is the system of any one of embodiments 14 through 15, wherein the user interface includes a selectable pause button associated with each automated rule, wherein selection of the pause button stops the associated rule from actively detecting any more users.

Embodiment 17 is the system of any one of embodiments 14 through 16, wherein the user interface includes a selectable deploy button associated with each automated rule, wherein selection of the deploy button transitions the associated automated rule from paused to actively detecting users Embodiment 18 is a system configured to provide a user interface that provides details of one particular automated rule of a plurality of automated rules.

Embodiment 19 is the system of embodiment 18, wherein the user interface includes a plurality of metrics in a portion of the user interface including one or more of an effectiveness of the particular rule based on the number of entities detected, the false positive rate, or when the rule was first created.

Embodiment 20 is the system of any one of embodiments 18 through 19, wherein the user interface includes a chart showing the effectiveness over time for a particular rule, charting rule coverage and false positives.

Embodiment 21 is the system of any one of embodiments 18 through 20, wherein the user interface includes presented metrics that show the accuracy of a particular rule, and links to pages that show the details of the entities that were accurately detected versus falsely detected.

Embodiment 22 is the system of any one of embodiments 18 through 21, wherein the user interface includes presented metrics that show a redundancy of a particular rule, the redundancy indicating a number of entities detected that were unique to just this rule versus also caught by at least one other rule.

Embodiment 23 is a system configured to provide a user interface that supports manual rules to be created, modified, deleted, and "backtested" (tested on historical data).

Embodiment 24 is the system of embodiment 23, wherein rules can be edited through a user interaction with the user interface.

Embodiment 25 is the system of any one of embodiments 23 through 24, wherein rules can be deleted through user interaction with the user interface.

Embodiment 26 is the system of any one of embodiments 23 through 25, wherein rules are selectively backtested against historical data, where the historical data time range is specified by the user in the user interface.

Embodiment 27 is the system of any one of embodiments 23 through 26, wherein for rule creation, the user interface supports complex Boolean logic (ANDS and ORs), standard numerical operands (e.g. equals, less than, greater than, less than equals, greater than equals) and string operands (e.g. =, starts with, ends with, regex match, substring) to manually generate a rule.

Embodiment 28 is the system of any one of embodiments 23 through 27, wherein the system backtests link to the entities that were correctly detected and the entities that were detected but may be false positives.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating rules for identifying malicious accounts or events, the method comprising:
   obtaining input data points associated with a plurality of entities corresponding to a user generated event or a user account;
   determining whether the input data points are labeled or unlabeled;
   in response to determining that the data points are labeled as positive, indicating a corresponding malicious entity, or negative, determining a set of features from the input data points using supervised machine learning techniques;
   generating a group of candidate single variable rules using the determined set of features that provide a greatest coverage of positive data points, wherein each rule specifies a matching condition based on a corresponding feature dimension;
   generating a group of candidate multi-variable rules from the single-variable rules;
   filtering the candidate single-variable and multi-variable rules using the negatively labeled input data points to generate a final set of valid rules;
   outputting the final set of valid rules; and
   applying the final set of valid rules to input data to identify malicious accounts or events.

2. The method of claim 1, wherein in response to determining that the data points are not labeled:
   generating labels using unsupervised machine learning;
   generating clusters of positively labeled data points; and
   determining a set of features for each cluster.

3. The method of claim 1, wherein the rules are periodically updated based on recent data points.

4. The method of claim 1, wherein each data point corresponds to a user generated event and includes a group of attributes describing the event.

5. The method of claim 1, wherein filtering the candidate single-variable and multi-variable rules comprises evaluating the candidate rules on the labeled data points based on accuracy and effectiveness metrics.

6. The method of claim 1, further comprising:
   maintaining metrics about each rule in the final set of valid rules including one or more of rule effectiveness, false positive rate, and recency.

7. The method of claim 6, wherein rules that fail to satisfy metric thresholds are removed.

8. The method of claim 1, further comprising:
   providing a user interface configured to selectively present rules and data about the effectiveness of each rule.

9. The method of claim 8, wherein the user interface is further configured to receive manually generated rules from a user, wherein the manually generated rules are backtested against historical data to validate the manually generated rules.

10. A system comprising:
    one or more computers and one or more storage devices storing instructions that are operable, when executed by the one or more computers, to cause the one or more computers to perform operations comprising:
      obtaining input data points associated with a plurality of entities corresponding to a user generated event or a user account;
      determining whether the input data points are labeled or unlabeled;
      in response to determining that the data points are labeled as positive, indicating a corresponding malicious entity, or negative, determining a set of features from the input data points using supervised machine learning techniques;

generating a group of candidate single variable rules using the determined set of features that provide a greatest coverage of positive data points, wherein each rule specifies a matching condition based on a corresponding feature dimension;

generating a group of candidate multi-variable rules from the single-variable rules;

filtering the candidate single-variable and multi-variable rules using the labeled input data points to generate a final set of valid rules;

outputting the final set of valid rules; and applying the final set of valid rules to input data to identify malicious accounts or events.

11. The system of claim 10, wherein in response to determining that the data points are not labeled:

generating labels using unsupervised machine learning;

generating clusters of positively labeled data points; and determining a set of features for each cluster.

12. The system of claim 10, wherein the rules are periodically updated based on recent data points.

13. The system of claim 10, wherein each data point corresponds to a user generated event and includes a group of attributes describing the event.

14. The system of claim 10, wherein filtering the candidate single-variable and multi-variable rules comprises evaluating the candidate rules on the labeled data points based on accuracy and effectiveness metrics.

15. The system of claim 10, further operable to cause the one or more computers to perform operations comprising:

maintaining metrics about each rule in the final set of valid rules including one or more of rule effectiveness, false positive rate, and recency.

16. The system of claim 15, wherein rules that fail to satisfy metric thresholds are removed.

17. The system of claim 10, further operable to cause the one or more computers to perform operations comprising:

providing a user interface configured to selectively present rules and data about the effectiveness of each rule.

18. The system of claim 17, wherein the user interface is further configured to receive manually generated rules from a user, wherein the manually generated rules are backtested against historical data to validate the manually generated rules.

19. One or more computer-readable storage media encoded with instructions that, when executed by one or more computers, cause the one or more computers to perform operations comprising:

obtaining input data points associated with a plurality of users entities corresponding to a user generated event or a user account;

determining whether the input data points are labeled or unlabeled;

in response to determining that the data points are labeled as positive, indicating a corresponding malicious entity, or negative, determining a set of features from the input data points using supervised machine learning techniques;

generating a group of candidate single variable rules using the determined set of features that provide a greatest coverage of positive data points, wherein each rule specifies a matching condition based on a corresponding feature dimension;

generating a group of candidate multi-variable rules from the single-variable rules;

filtering the candidate single-variable and multi-variable rules using the negatively labeled input data points to generate a final set of valid rules;

outputting the final set of valid rules; and applying the final set of valid rules to input data to identify malicious accounts or events.

* * * * *

UNITED STATES PATENT AND TRADEMARK OFFICE
CERTIFICATE OF CORRECTION

PATENT NO. : 11,232,364 B2
APPLICATION NO. : 15/944701
DATED : January 25, 2022
INVENTOR(S) : Catherine Lu et al.

Page 1 of 1

It is certified that error appears in the above-identified patent and that said Letters Patent is hereby corrected as shown below:

In the Claims

Column 14, Line 13, in Claim 19: before "entities" delete "users".

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*